United States Patent [19]

Diperstein

[11] 4,247,973
[45] Feb. 3, 1981

[54] METHOD AND APPARATUS FOR REPAIRING CRACKED METAL PARTS
[75] Inventor: David Diperstein, Glenside, Pa.
[73] Assignee: Seal Lock International, Inc., Philadelphia, Pa.
[21] Appl. No.: 51,929
[22] Filed: Jun. 25, 1979
[51] Int. Cl.³ .................................................. B23P 7/04
[52] U.S. Cl. .................................... 29/402.11; 408/79; 29/530
[58] Field of Search ............ 29/402.03, 402.04, 402.05, 29/402.08, 402.09, 402.19, 402.06, 402.11, 402.12, 402.13, 530; 408/82, 83, 116, 79, 80

[56] References Cited
U.S. PATENT DOCUMENTS

| 2,198,167 | 4/1940 | Harman | 29/402.11 |
|---|---|---|---|
| 2,401,490 | 6/1946 | Little | 408/79 |
| 2,466,023 | 4/1949 | Griffin | 408/79 |
| 2,674,906 | 4/1954 | Timpner | 408/79 |
| 2,986,050 | 5/1961 | Wolf | 408/79 |
| 2,998,645 | 9/1961 | Diperstein | 29/402.11 |

FOREIGN PATENT DOCUMENTS 122162  7/1948  Sweden ................. 408/79

*Primary Examiner*—Leon Gilden
*Assistant Examiner*—V. K. Rising
*Attorney, Agent, or Firm*—Seidel, Gonda, Goldhammer & Panitch

[57] ABSTRACT

Metal parts on opposite sides of a crack or the like are joined together by drilling holes in the metal and then inserting a fastener. A tool is provided which assures uniformity in the location of contiguous holes into which the fastener is inserted.

5 Claims, 8 Drawing Figures

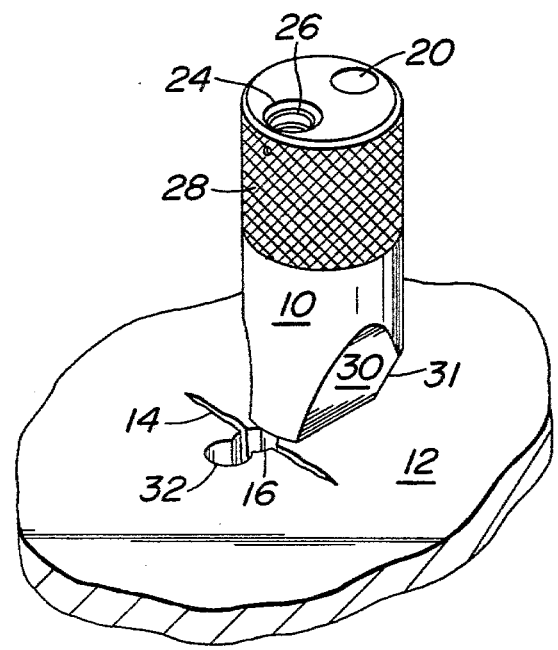
FIG. 1
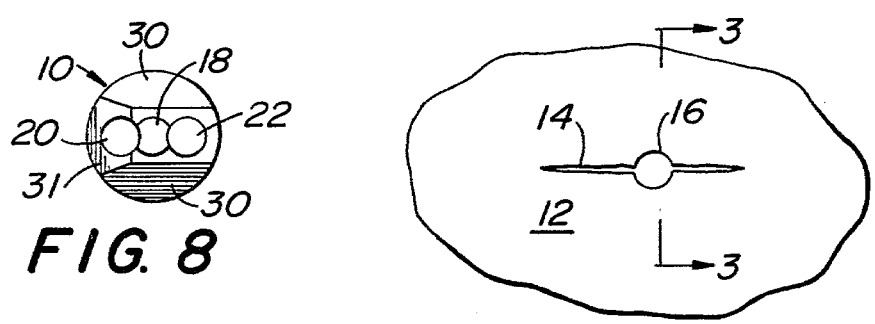
FIG. 8
FIG. 2
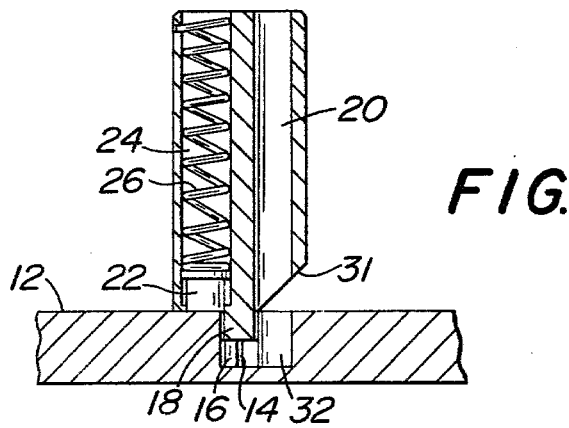
FIG. 3

METHOD AND APPARATUS FOR REPAIRING CRACKED METAL PARTS

BACKGROUND

The present invention relates to a method of preparing cracked and broken metal parts. For relevant prior art, see U.S. Pat. Nos. 2,198,167 and 2,998,645. Metal parts such as engine blocks, cylinder heads, industrial castings and the like which are cracked or broken may be repaired without dismantling and without expensive machining. The method as reflected by said patents involves drilling contiguous holes in a row in the metal. If adjacent holes overlap one another by too great an extent or do not sufficiently overlap one another, a problem is created when it is desired to insert a fastener into the holes since the fastener will not fit properly. The present invention solves that problem.

SUMMARY OF THE INVENTION

In the method of joining metal on opposite sides of a gap, crack or the like, a first hole is drilled in the gap using a drill bit of a size so that a portion of the first hole is disposed in the metal on opposite sides of the gap. A tool having a projection and a bore contiguous with the projection is provided. Said drill bit is inserted through said bore and utilized to drill a second hole while said projection is disposed in said first hole. The tool is then rotated 180° and said drill bit is utilized to drill a third hole contiguous with said first hole. When the tool is moved 180°, a second projection on the tool enters said second hole. The projection may now be moved to either the second or third holes so that fourth and/or fifth holes may be provided with all of the holes being in a row.

It is an object of the present invention to provide novel apparatus and method for joining cracked or broken metal parts in a manner which assures that drilled holes will be properly orientated to one another for receiving a preformed insert fastener.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a perspective view of a tool in accordance with the present invention being used to repair a crack in a metal wall.

FIG. 2 is a plan view of the crack in the metal wall with a first hole drilled in the gap.

FIG. 3 is a vertical sectional view of the tool shown in FIG. 1 with a projection entering the first hole and showing the arrangement after a second hole has been drilled in the gap.

FIG. 8 is a bottom plan view of the tool.

Figure 4:
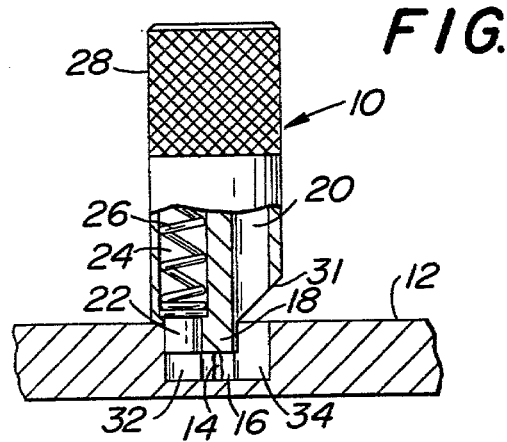
FIG. 4 is a view similar to FIG. 3 but shows the arrangement after a third hole is drilled in the gap.
Figure 5:
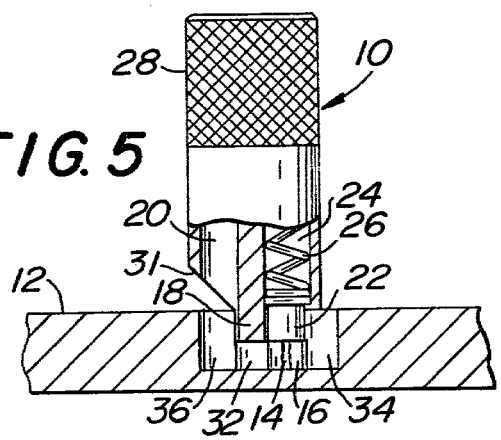
FIG. 5 is a view similar to FIG. 4 but showing the the arrangement after a fourth hole has been drilled in the gap.

Referring to the drawings in detail, wherein like numerals indicate like elements, there is shown a tool designated generally as 10 for use in repairing a crack or gap 14 in a metal member 12.

Using a drill bit not shown, a first hole 16 is drilled in the crack 14. The diameter of the hole 16 is sufficiently large so as to remove metal from a portion of metal member 12 on opposite sides of the crack 14. See FIG. 2. The hole 16 need not be drilled through the entire thickness of the metal member 12.

The tool 10 is utilized in connection with the drilling of the remainder of the number of holes to be drilled in connection with the repair of the crack 14. The tool 10 is a metal tool having a first rigid projection 18 at its lower end. Tool 10 has a longitudinally extending bore 20 open at each end and contiguous with the projection 18. A second bore 24 is provided in the tool 10 on the opposite side of the longitudinal axis with respect to the bore 20. A second projection is disposed within the bore 24 and spring biased to a position out of the bore 24 by a spring 26. The projection 22 has a shoulder at its upper end which contacts a shoulder at the lower end of bore 24 whereby the spring 26 cannot cause the projection 22 to leave bore 24.

The upper end of spring 26 is retained with the bore in any convenient manner. As shown, the uppermost coil of spring 26 extends into a slot which intersects bore 24. If desired, a threaded plug may be utilized for contacting the spring 26 and adjusting the compression thereof. The upper end of the tool 12 is preferably provided with knurling 28. At the lower end of the tool 10, on opposite sides thereof, there is provided flats 30. In addition, there is provided a bevel 31 which is intersected by the bore 20. Bevel 31 facilitates observation of the drill bit while it is drilling a hole in the metal member 12.

After the first hole 16 has been drilled, the projection 18 is introduced into the hole 16. Projection 22 is forced into the bore 24. The tool 10 is then orientated so as to align bore 20 with the intended location for the second hole. Thereafter, a drill bit is introduced through the bore 20 and a second hole 22 is drilled in the crack 14. See FIG. 3.

After the second hole 32 is drilled, the tool 10 is rotated 180° until projection 32 enters the second hole 32. See FIG. 4. Thereafter, the same drill bit in bore 20 is utilized to drill hole 34. If a fourth hole is desired, the tool 10 is moved upwardly and then projection 18 is placed in the hole 32 while projection 32 enters the hole 16. Thereafter, the same drill bit is utilized to drill a fourth hole 36. If a fifth hole 37 is desired, it is drilled with projection 18 in hole 34 and projection 22 in hole 16.

Insert fasteners 38 are provided. See FIG. 6. The fastener 38 has a shape corresponding to the shape of the contiguous holes 34, 16, 32, 36, 37 which form a row transverse to the crack 14. The fastener 38 is placed into the holes and forcefit therein so as to provide a watertight joint which is stronger than the original metal member 12. The number of rows of holes drilled is related to the length of the crack 14. Since each hole, other than the first hole 16, has been pre-orientated by tool 10 so that each hole overlaps the next adjacent hole by a uniform amount, the opening defined by the drilled holes corresponds identically with the shape of the fastener 38. A separate template is not needed.

Figure 6:
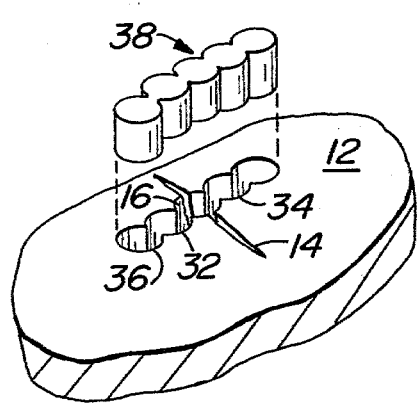
FIG. 6 is a perspective view of the drilled holes and an insert fastener.
Figure 7:
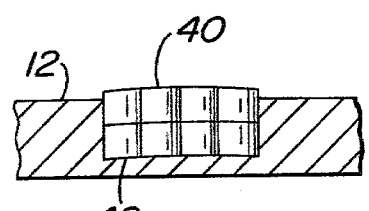
FIG. 7 is a sectional view through a repaired crack wherein two or more insert fasteners are utilized one above the other.

If the wall of the metal member 12 is exceptionally thick, two or more fasteners 40, 42 may be superimposed over one another to fill the cavity defined by the overlapping holes. The upper surface on each of the fasteners 38, 40, 42 is preferably provided with a slight crown as shown in FIG. 7. The fasteners may have three lobes, four lobes as shown in FIG. 7, or five lobes as shown in FIG. 6.

The present invention may be embodied in other specific forms without departing from the spirit or essential attributes thereof and, accordingly, reference should be made to the appended claims, rather than to the foregoing specification, as indicating the scope of the invention.

I claim:

1. A method of joining metal on opposite sides of a gap, crack or the like, comprising:
    (a) drilling a first hole in the gap with a drill bit of a size so that a portion of the first hole is in the metal on opposite sides of the crack,
    (b) inserting a first projection on a tool in said first hole, using a tool having a bore contiguous with said projection, orientating the tool so that said bore overlies the desired position for a second hole,
    (c) inserting said drill bit through said bore and drilling a second hole contiguous with said first hole,
    (d) moving the fixture 180°, moving a second projection on said tool into said second hole, then using said drill bit to drill a third hole which is contiguous with said first hole so that all of said holes are in a row transverse to the crack and with uniform overlap between adjacent holes,
    (e) inserting and securing a fastener in said holes.

2. A method in accordance with claim 1 wherein said step of moving the tool 180° includes rotating the tool about the longitudinal axis of said first projection.

3. A method in accordance with claim 1 wherein said step of moving a second projection includes using a second projection which is spring biased downwardly into the second hole.

4. A tool for use in joining metal on opposite sides of a gap, crack of the like, comprising a tool having a centrally disposed first projection at one end thereof, said tool having a longitudinally extending bore parallel and contiguous with said projection, said bore being open at each side so that it may receive therewithin a drill bit, said tool having a bevel at the end thereof adjacent said projection and through which said bore extends so that a drill bit can be observed at the lower end of said bore, said tool having a second bore diametrically opposite said first bore, a second projection disposed in said second bore contiguous with said first projection, said second projection being movable to a position wherein it partially projects out of said second bore alongside said first projection.

5. Apparatus in accordance with claim 4 wherein said second projection is spring biased to said position and is capable of being forced entirely into the second bore whereby the tool may be rotated through 180° when the first projection extends into a hole.

* * * * *

UNITED STATES PATENT AND TRADEMARK OFFICE
CERTIFICATE OF CORRECTION

PATENT NO. : 4,247,973
DATED : February 3, 1981
INVENTOR(S) : Diperstein

It is certified that error appears in the above—identified patent and that said Letters Patent is hereby corrected as shown below:

Column 2, line 40, change "22" to --32--;

Column 2, line 43, change "32" to --22--;

Column 2, line 47, change "32" (second occurrence) to -- 22 --.

Signed and Sealed this

Eleventh Day of May 1982

[SEAL]

Attest:

Attesting Officer

GERALD J. MOSSINGHOFF

Commissioner of Patents and Trademarks